US008074763B2

(12) United States Patent
Hung et al.

(10) Patent No.: US 8,074,763 B2
(45) Date of Patent: Dec. 13, 2011

(54) POWER ASSIST STEERING SYSTEM

(75) Inventors: Stephen T. Hung, Grosse Pointe Park, MI (US); Michael J. Gabel, Huntington Woods, MI (US); John Francis Laidlaw, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 12/900,632

(22) Filed: Oct. 8, 2010

(65) Prior Publication Data
US 2011/0022272 A1    Jan. 27, 2011

Related U.S. Application Data

(62) Division of application No. 11/693,481, filed on Mar. 29, 2007, now Pat. No. 7,832,523.

(51) Int. Cl.
B62D 5/06 (2006.01)
(52) U.S. Cl. ........................................ 180/421; 180/417
(58) Field of Classification Search .................. 180/421, 180/417
See application file for complete search history.

(56) References Cited

U.S. PATENT DOCUMENTS

| | | | |
|---|---|---|---|
| 4,119,172 A | 10/1978 | Yanagishima et al. | |
| 4,678,052 A | 7/1987 | Suzuki et al. | |
| 4,681,184 A | 7/1987 | Suzuki et al. | |
| 5,439,070 A | 8/1995 | Haga et al. | |
| 5,511,630 A * | 4/1996 | Kohata et al. | 180/422 |
| 5,513,720 A * | 5/1996 | Yamamoto et al. | 180/421 |
| 5,593,002 A | 1/1997 | Okada et al. | |
| 5,687,810 A | 11/1997 | Choi et al. | |
| 5,755,300 A | 5/1998 | Lee et al. | |
| 6,105,711 A | 8/2000 | Maruyama et al. | |
| 6,173,223 B1 | 1/2001 | Liubakka et al. | |
| 6,178,365 B1 * | 1/2001 | Kawagoe et al. | 701/41 |
| 6,227,328 B1 * | 5/2001 | Shimizu | 180/422 |
| 6,298,941 B1 * | 10/2001 | Spadafora | 180/422 |
| 6,311,799 B1 * | 11/2001 | Kaji | 180/422 |
| 6,400,140 B1 | 6/2002 | Lee | |
| 6,481,297 B2 * | 11/2002 | Kim et al. | 73/862.331 |
| 6,499,557 B2 | 12/2002 | Takai et al. | |
| 6,550,569 B2 * | 4/2003 | Kim et al. | 180/446 |
| 6,571,176 B1 * | 5/2003 | Shinmura et al. | 701/301 |
| 6,619,422 B2 * | 9/2003 | Takeuchi et al. | 180/446 |
| 6,681,884 B2 | 1/2004 | Shimizu et al. | |
| 6,768,283 B2 * | 7/2004 | Tanaka et al. | 318/632 |
| 6,880,668 B2 * | 4/2005 | Sakaki et al. | 180/441 |
| 6,978,859 B2 * | 12/2005 | Torizawa | 180/405 |
| 7,240,760 B2 * | 7/2007 | Sherwin | 180/421 |
| 7,325,645 B2 * | 2/2008 | Sakaki et al. | 180/441 |

(Continued)

Primary Examiner — Joanne Silbermann
Assistant Examiner — Michael Stabley
(74) Attorney, Agent, or Firm — Jerome R. Drouillard; Fredrick Owens

(57) ABSTRACT

The present invention provides a power assist steering system for use with a motor vehicle utilizing a torque sensor and an electronically controlled hydraulic valve used to supply or meter hydraulic fluid to a hydraulic cylinder that provides power assist to the steering system. The torque sensor measures driver input and provides a signal to the controller that controls an electrically actuated hydraulic valve. Additionally, steering wheel rotational speed and position are also input to the controller wherein the controller generates a steering assist command that minimizes the magnitude of difference, or error, between the steering torque reference value determined from the steering wheel speed and position and the measured torque. By doing so, the invention controls steering wheel feel, as opposed to the conventional practice of controlling the steering assist boost curve.

7 Claims, 3 Drawing Sheets

U.S. PATENT DOCUMENTS

| | | |
|---|---|---|
| 7,383,111 B2 * | 6/2008 | Takimoto et al. ............... 701/41 |
| 7,392,878 B2 * | 7/2008 | Ono et al. .................... 180/421 |
| 7,484,588 B2 * | 2/2009 | Szabela et al. ............... 180/417 |
| 7,648,003 B2 * | 1/2010 | Miyajima et al. ............. 180/422 |
| 7,835,836 B2 * | 11/2010 | Bolourchi et al. ............. 701/41 |
| 2002/0129666 A1 | 9/2002 | Kim et al. |
| 2003/0024758 A1 | 2/2003 | Fujita |
| 2004/0078166 A1 | 4/2004 | Shin |
| 2004/0089497 A1 | 5/2004 | Kang |
| 2004/0195037 A1 * | 10/2004 | Otaki et al. ................... 180/421 |
| 2005/0061574 A1 | 3/2005 | Torizawa |
| 2005/0257988 A1 * | 11/2005 | Ohta et al. .................... 180/421 |
| 2007/0017734 A1 * | 1/2007 | Sherwin ....................... 180/446 |
| 2007/0193818 A1 * | 8/2007 | Hidaka ......................... 180/421 |

* cited by examiner

POWER ASSIST STEERING SYSTEM

CROSS-REFERENCE TO RELATED APPLICATIONS

This application is a divisional of U.S. application Ser. No. 11/693,481, filed on Mar. 29, 2007 now U.S. Pat. No. 7,832,523, herein incorporated by reference.

BACKGROUND OF THE INVENTION

1. Field of the Invention

The present invention relates generally to a vehicle steering system and more specifically to a method and apparatus for hydraulically assisting a steering system.

2. Description of Related Art

A typical automotive vehicle generally utilizes a steering member, such as a steering wheel, connected to the vehicle wheels through a rack and pinion mechanism. As the vehicle operator manipulates or moves the steering wheel, the corresponding vehicle wheels turn accordingly.

In a rack and pinion steering mechanism rotation of the steering wheel rotates a pinion gear coupled to the steering wheel through a steering column or shaft. The pinion gear engages a rack gear disposed between the steerable wheels. Accordingly, rotational motion of the steering wheel is translated into lateral motion that correspondingly turns the vehicle wheels. In order to reduce the amount of vehicle operator effort required to rotate the steering wheel and correspondingly turn the vehicle, many steering systems include a power assist system. The power assist system assists the vehicle operator with rotation of the steering wheel to overcome road load forces occurring during vehicle operation.

Conventional power assist steering systems typically employ either hydraulic power assist or electric power assist mechanisms. Such power assist systems vary the amount of power assistance depending upon the speed of the vehicle and the amount of effort applied by the vehicle operator to turn the steering wheel. Current hydraulic power assist steering systems typically utilize a metering valve integrated into the input/pinion shaft of a steering gear. As the vehicle operator applies an input through the steering wheel, the valve directs and meters the flow of hydraulic fluid to provide proportional steering assist. Typically, such a system requires expensive high-precision manufacturing processes to produce a proper metering valve. Furthermore, such a system typically has a single, pre-defined boost or assist curve that depends on valve geometry. Such systems typically do not provide sufficient assist across the full range of vehicle speeds. For example, when steering the vehicle at slower speeds such as during parking, or when the vehicle is stationary, a greater amount of assist is usually needed. At higher vehicle speeds, the system may provide too much assistance thus reducing the feel of the steering system.

In addition, the power steering pump, used to generate the hydraulic fluid pressure that provides the assist force, typically runs off of the vehicle engine; i.e. the pump is typically driven via a belt connected to the output shaft of the engine. Accordingly, the pressure generated by the pump varies with engine speed or engine revolutions. When the engine is operating at a low speed or RPM, the power steering pump must provide a sufficient supply of pressurized hydraulic fluid to assist the vehicle operator in steering the vehicle. Accordingly, the power steering pump is tuned or configured to provide a suitable power assist at low speeds or RPMs. Correspondingly, when the engine is operating at high engine speeds or RPMs, the power steering pump operates at a high output using additional energy from the vehicle engine while needing a bypass or bleed circuit to reduce excess fluid pressure and flow. Thus, the power cost of the pump is highest at high engine speeds; i.e., engine speeds normally associated with high vehicle speeds, a condition not normally requiring an increased level of steering assistance. In addition, high output of the power steering pump may result in too much steering assist at high speed thereby reducing the feel of the steering system.

With electric power assist mechanisms, an electric motor is used to provide a steering boost or assist. The electric motor can be attached at a variety of positions on the steering assembly. Sensors detect the motion of the steering column and provided an input to the electric motor. Typically, some type of software or other computer program tunes the characteristics of the electric power steering system to provide steering feel to the vehicle operator. Often, these systems have issues with feel in that the feel may be too light or does not approximate. the force needed to turn the vehicle. In addition, limits on the vehicle electric system limit the size of the motor used to provide the power assist. Further, the software may have to be complex or be based on complex model based control algorithms to improve the electric motor efficiency. Such systems must address a multitude of key system parameters such as, motor currents, motor wire positions and motor supply voltage fluctuations along with driver input and feel.

Accordingly, it is desirable to provide a steering assist that controls and provides a variable or multiple boost curves which improves vehicle steering feel across the full range of vehicle speeds.

SUMMARY OF THE INVENTION

The present invention provides a steering system that provides a power assist to a vehicle operator. In one aspect of the invention, a power assist steering system for automotive vehicle includes a steering gear having a pinion gear and rack. An input shaft connects to the pinion gear on one end and to a steering wheel on the other, whereby a vehicle operator transmits a steering force from the steering wheel to the pinion gear. The system also includes a fluid assist assembly including a fluid cylinder and piston connected to the steering gear. An electromagnetically actuated control valve supplies or meters a fluid from a fluid pressure source to the fluid assist assembly to provide a power assist for the steering system. A steering input torque sensor located on the input shaft measures the torque on the input shaft. The system also includes a steering input rotation sensor measuring rotary motion of the input shaft. An electronic control unit generates an assist command based on the measured steering input torque obtained from torque sensor and the steering input torque reference value derived from the steering input rotation sensor data and vehicle speed data. The electronic control unit outputs the assist command in the form of a control signal to the electromagnetically actuated control valve. Adjustment of the assist command minimizes the magnitude of difference, or error, between the steering input torque reference value and the measured steering input torque.

A further aspect of the invention includes a method of providing assist to a vehicle steering system having a steering gear, a fluid assist assembly and an input shaft attached to the steering gear with the steering wheel attached to the input shaft. The method includes the steps of using a torque sensor to measure torque in the steering system and regulating the measured torque could be based on of the position of the steering wheel determined by a steering input rotation sensor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
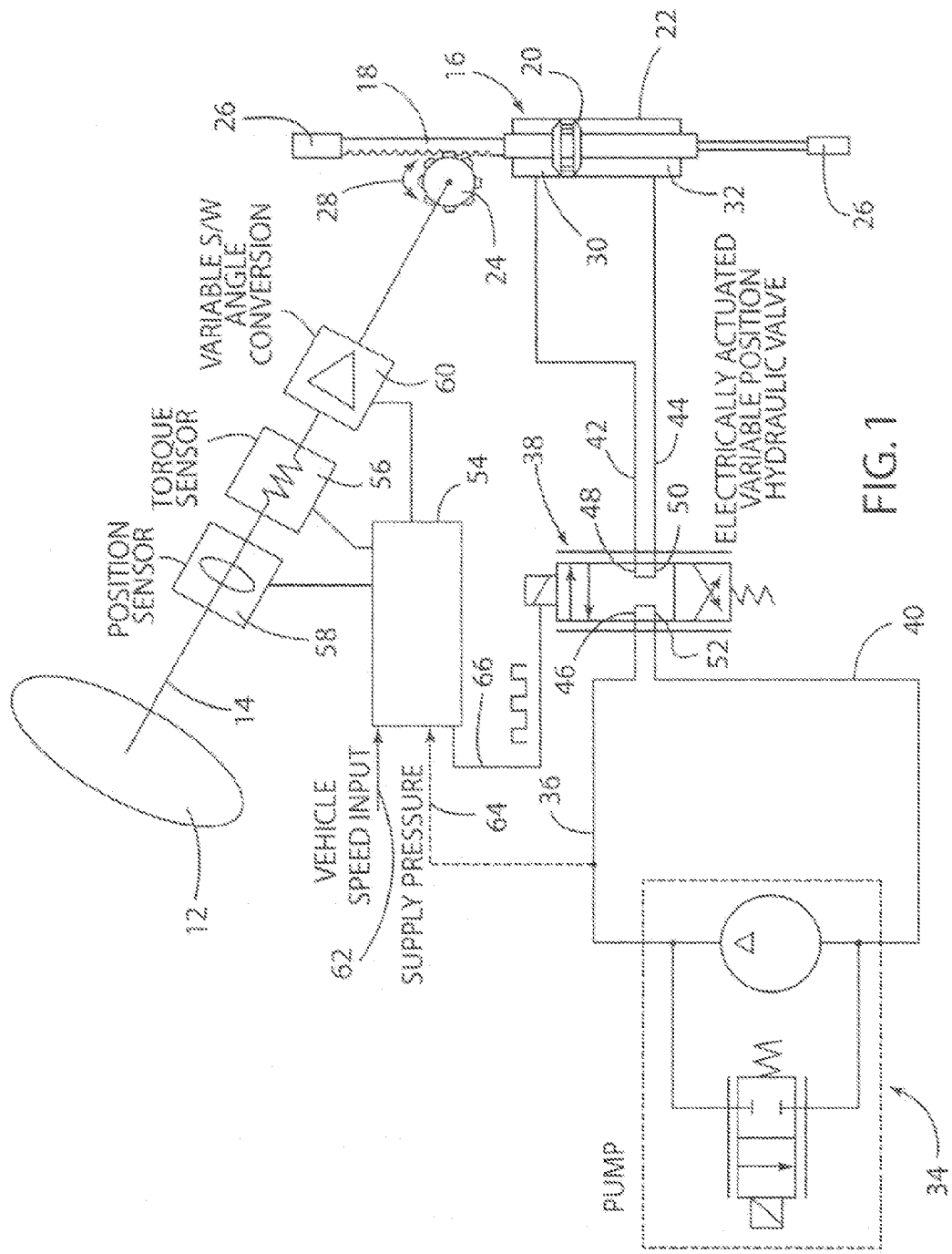
FIG. 1 is a schematic diagram of a steering system in accordance with one embodiment of the present invention.

FIG. 1 is a schematic diagram illustrating a basic configuration of a power assist steering system, seen generally at 10, in accordance with one embodiment of the present invention. The power assist steering system 10 generally includes a steering wheel 12, a steering or input shaft 14, and a steering gear including an actuation mechanism, seen generally at 16. The actuation mechanism typically comprises a mechanical linkage that translates the rotary motion of the steering wheel into linear motion used to turn or position steerable vehicle wheels. Different types of known actuation mechanisms including rack and pinion and recirculating-ball systems can be used with the present invention; also suitable are various types of lever arms and gear mechanisms. As disclosed herein, the steering gear 16 according to one embodiment of the present invention includes a steering rack 18, a hydraulic assist piston 20 located in a hydraulic cylinder or housing 22 and a pinion gear 24. The pinion gear 24 is connected to the steering or input shaft 14 and engages the steering rack 18. When the steering gear 16 is installed in a vehicle, the opposite ends 26 of the steering rack 18 are connected to steering linkages, which in turn, connect the steering gear to a pair of steerable vehicle wheels (not shown). Accordingly, the steering gear 16 operates to move the rack 18 in response to rotation of the input shaft 14, which correspondingly operates to rotate the pinion gear 24 in the direction of the arrow 28. The hydraulic assist piston 20 and hydraulic cylinder are housing 22 as described herein are one example of a power assist system, using a hydraulic fluid such as oil or, other low compressibility fluid, to provide a fluid assist to the steering system. While use of a hydraulic fluid is disclosed, the present invention is not limited to the type of fluid used to provide the power assist, nor is it limited to the particular actuation mechanism that translates the rotary motion of the steering wheel into an input used to position the steerable vehicle wheels.

The housing or hydraulic cylinder 22 includes first and second hydraulic fluid chambers 30, 32 located on opposite sides of the piston 20. A hydraulic pump, seen generally at 34, having a recirculation assembly and flow control mechanism, supplies hydraulic fluid through a hydraulic inlet or supply line 36 to a control valve, seen generally at 38, and receives returning hydraulic fluid from the control valve 38 from a hydraulic outlet or return line 40. The hydraulic pump 34 can be driven by an electric motor or by the vehicle engine. The control valve 38 connects to the first fluid chamber 30 through a first two-way hydraulic line 42 and to the second fluid chamber 32 through a second two-way hydraulic line 44. When the vehicle operator driver turns the steering wheel 12 the control valve 38, based on a signal received from the electronic control unit 54, supplies hydraulic fluid to one of the first and second chambers 30, 32. Thus, the control valve 38 creates a hydraulic fluid pressure differential between the respective first and second fluid chambers 30, 32 causing the piston 20, and correspondingly the rack 18, to move in the direction of the lower pressure fluid chamber thereby assisting the vehicle operator in turning the vehicle wheels and steering the vehicle.

In the preferred embodiment, the control valve 38 is a four-way electromagnetically actuated electro-hydraulic control valve having a one-way fluid input port 46 communicating with the pump 34 through the inlet or supply line 36. A one-way first fluid output port 48 communicates through the two-way hydraulic line 42 with the first fluid chamber 30. A one-way second fluid output port 50 communicates through the two-way hydraulic line 44 with the second fluid chamber 32. A one-way fluid return port 52 communicates with the pump 34 through the outlet or return line 40. In the unexcited or default state, the one-way input port 46 is connected to the one-way fluid return port 52 with minimal restriction while presenting a balanced obstruction or flow restriction opening between the respective first fluid output port 48 and second fluid output port 50. Accordingly, the pressure in both the first and second fluid chambers 30, 32 is equal. Upon receiving a variable excitation signal the control valve 38 operates to open the restriction between the one-way input port 46 and one of the first fluid output port 48 and second fluid output port 50 while closing the restriction between the input port 46 and the return port 52. Accordingly, hydraulic fluid travels through the respective two-way hydraulic lines 42, 44 in and out of the respective first fluid chamber 30 and second fluid chamber 32 thus moving the piston 20 within the housing or hydraulic cylinder 22.

A steering system electronic control unit or valve controller 54 generates a signal that excites the electromagnetic coils of the control valve 38 to open and close the restrictions between the fluid input port 46 and the various fluid output ports 48-52 of the control valve 38. A steering input torque sensor 56 located on the steering shaft 14 senses bidirectional torque imparted to the steering shaft 14. Torque can be imparted to the steering shaft 14 as a result of either the vehicle operator applying force to the steering wheel 12, or as a result of the vehicle wheels providing a force on the hydraulic steering gear 16. Accordingly, multiple torque sensor locations may be used to sense torque imparted to the input shaft 14 adjacent to the steering wheel 12, at an intermediate location on the steering shaft 14 or at the steering or input shaft 14 and pinion gear 24 assembly. The electronic control unit 54, which includes torque sensor signal conditioning electronics, is located immediately adjacent to the torque sensor 56 to minimize the connection distance between the electronic control unit 54 and the torque sensor 56 thereby minimizing torque sensor signal susceptibility to electromagnetic interference from external sources.

A steering input rotation or position sensor 58 is located on the input shaft 14 and measures rotary motion of the steering input shaft 14.

Associated position sensor 58 signal conditioner electronics can be located separate from or in the electronic control unit 54. In addition, input from a variable steering wheel angle conversion sensor 60 is also transmitted to the electronic control unit 54. Additional inputs to the electronic control unit 54 may include the vehicle speed 62 and the hydraulic supply pressure 64 generated by the pump 34. Accordingly, the electronic control unit 54 receives a plurality of inputs related to the vehicle operating conditions and generates an output 66, typically a pair of complementary electric current signals, illustrated as a modulated pulse, used to drive an electromagnetic coil of the control valve 38 and correspondingly control the output of the hydraulic pressure received from the pump 34.

Physically grouping the electronic control unit 54, and associated signal conditioning electronics, near or with the torque sensor 56 eliminates the need to transmit electrical high frequency signals which are potential emitters of electromagnetically radiated interference or electrical signals of low signal levels or low frequencies which are potentially susceptible to corruption from externally-imposed, electromagnetically radiated interference.

The control valve 38 can be integrated with the housing 22 of the hydraulic steering gear 16 or spaced therefrom and positioned adjacent the pump 34 and associated hydraulic reservoir. In addition, in the preferred embodiment the pump 34 is an electric motor driven fixed displacement pump. The invention, however, contemplates utilizing a bi-directional pump. In addition, other means or mechanisms can drive the pump, including the vehicle engine.

As illustrated herein, the present invention replaces a conventional steering valve and torsion bar assembly, which requires tight tolerances and an involved manufacturing process. Accordingly, the torque sensor 56 measures driver input and provides a redundant signal to the electronic control unit 54 that controls the electrically actuated control valve 38. The control unit 54 enables a steering system having both linear and non-linear boost curves. For example the boost may be small when the input torque is small and conversely the steering system may generate a high boost or steering assist when a high input torque is generated, for example during a parking maneuver. Based upon the input and measured torque values the power assist steer system 10, through the electronic control unit 54, provides variable hydraulic pressure and thus power to impart a steering assist force.

Figure 2:
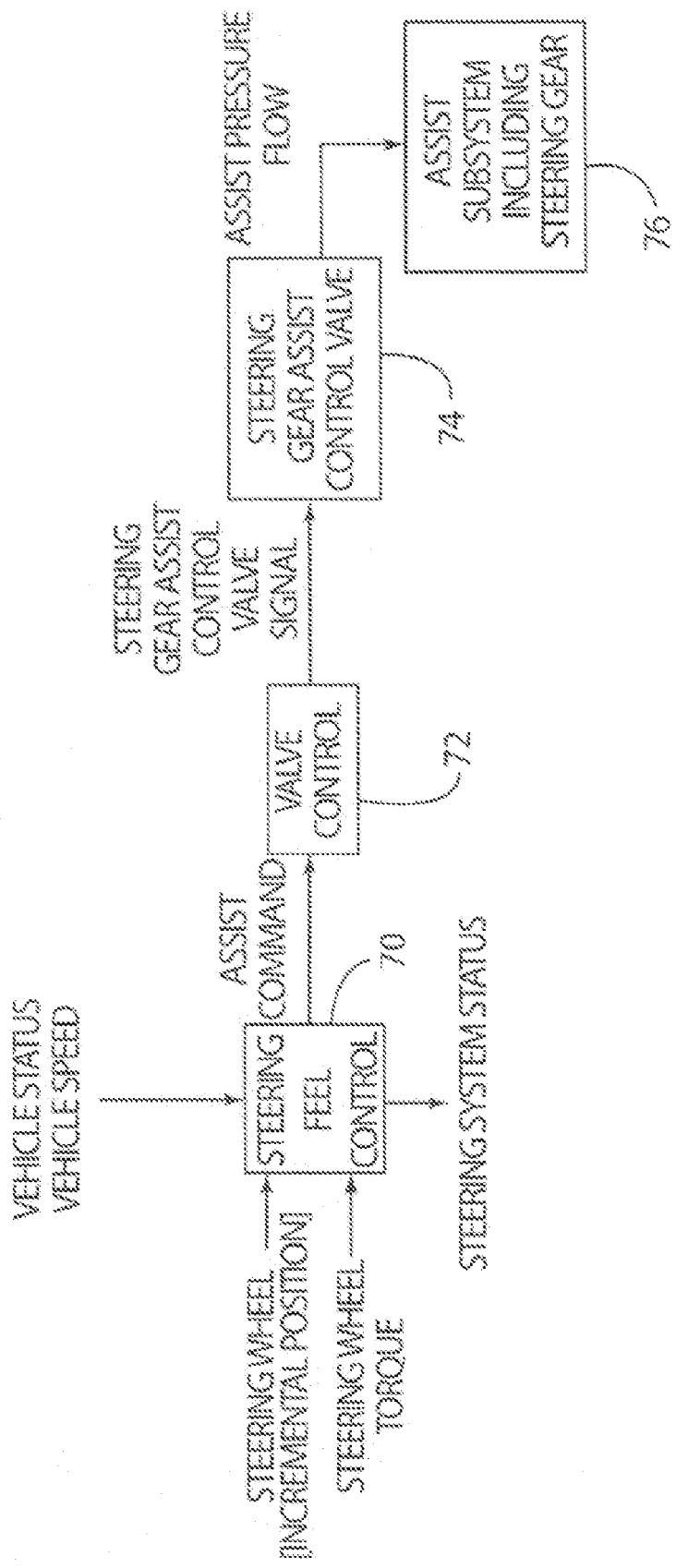
FIG. 2 is a block diagram of a steering system control strategy in accordance with one embodiment of the present invention.

FIG. 2 is a flowchart illustrating the valve control and assist topology. The present invention includes a particular steering assist control for a steering system that maintains a mechanical linkage between the steering wheel and the steering linkage that connects to the steering road wheels. As set forth more fully herein, the present invention treats-actual/measured steering input torque as a steering system output and regulates the actual/measured steering input torque through explicit feedback control. Specifically, since the steering wheel 11 is connected to a steering linkage, steering or input shaft 14, to the road wheels, road wheel induced disturbances will create steering wheel torque. Thus, the present invention regulates power assist output based on steering wheel position, steering wheel speed and other factors.

Figure 3:
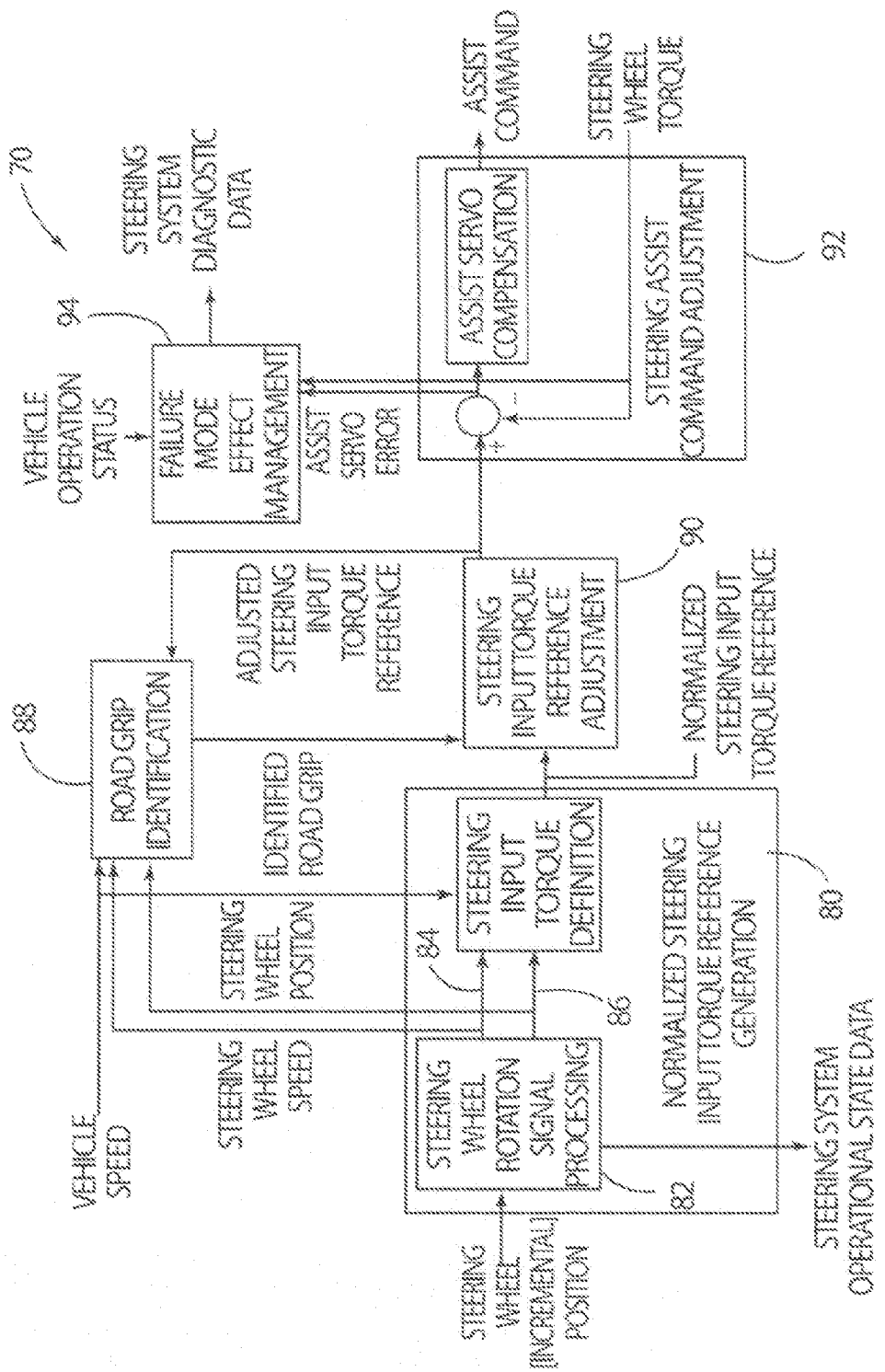
FIG. 3 is a block diagram and flowcharts illustrating a steering feel control architecture for a steering system according to the present invention.

As illustrated in FIG. 2, and in greater detail in FIG. 3, a steering feel control module or architecture 70 utilizes measured steering input torque, the torque measured by the torque sensor 56, and not steering assist force or assist torque. The steering feel control module 70 may be software or an algorithm that generates an output based on the input values. Information relating to steering wheel incremental position, steering wheel torque, vehicle speed and vehicle status is input into the steering feel control module 70. The steering feel control module 70 then generates a steering system status output and an assist command. The assist command is routed to the valve control, seen as block 72, which generates a steering gear assist control valve signal. The steering gear assist control valve signal may be generated as part of the steering feel control module or it may be packaged with the steering gear assist control valve 74. The steering gear assist control valve signal causes the steering gear assist control valve 74 to generate an assist pressure and corresponding flow of hydraulic fluid to the steering gear assist subsystem 76.

FIG. 3 is a schematic block diagram illustrating the steering feel control module 70. Block 80 illustrates the step of generating a normalized steering input torque reference value based on steering wheel position. As illustrated, block 82 processes steering wheel rotational signals splitting them into a steering wheel speed output 84 and a steering wheel position output 86. In addition, vehicle speed data is also used. Accordingly, absolute steering wheel rotational position data, steering wheel input rotational velocity data and vehicle speed data are used to generate a normalized steering input torque reference value. As illustrated, the steering wheel speed and steering wheel position data is shared through data transmission means with a road grip identification module 88.

The road grip identification module 88, again the module can be hardware, software or an algorithm, is of the type that, based upon a plurality of measured signals such as yaw rate, lateral acceleration, wheel speed, and steering wheel rotational velocity and position data, estimates road/tire friction. Block 90 illustrates the step of calculating a steering input torque reference adjustment based on the normalized steering input torque reference output of block 80 and an identified road grip value generated by road grip identification block 88. As illustrated, the adjusted steering input torque reference value is also input into the calculation of the road grip value generated by block 88.

Block 92 illustrates the step of adjustment of the steering assist command in order to minimize the magnitude of difference or error between the adjusted steering input torque reference, generated at block 90, and the measured steering input torque obtained from torque sensor 56. Minimization of the error between the adjusted steering input torque reference and the measured steering input torque includes frequency-dependent and or magnitude-dependent compensation that ensures overall steering system stability and allows desirable frequency-dependency of suppression or transmission of road wheel-induced disturbances relative to actual steering input torque. Accordingly, as illustrated in block 92, the steering wheel torque and steering input torque reference adjustment are combined to generate an assist servo compensation output used to generate a steering assist command, which as illustrated in FIG. 2, generates a valve control signal.

The steering feel control module or architecture 70 further includes a failure mode effect management block 94 that supervises and monitors the system for failure mode effect detection and management in the event of torque sensor faults or failure of the control system to minimize the magnitude of difference, or error, between the adjusted steering input torque reference and the measured steering input torque. Supervision of the steering system includes adjustment of the steering assist command in response to vehicle operational status data received by the vehicle operational data reception means. The system also adjusts the steering assist command in the event of detection of failure to minimize the error between the adjusted steering input torque reference and the measured steering input torque. Accordingly as illustrated, the failure mode effect management block relies on vehicle operations status, steering input torque reference adjustment and steering wheel torque inputs to generate a steering system diagnostic data. The data may be obtained in response to a diagnostic query or in response to vehicle runtime status.

As set forth previously, the steering assist command is converted into a pair of complementary electric current signals that excite the electromagnetic coils of the steering gear assist control valve. The present invention further contemplates, due to electromechanical bandwidth limitations of the steering gear assist control valve, that the frequency of excitation of the electronic control unit's complementary pulse width modulation current output is sufficiently low so as to not present electromagnetic radiated emissions of significant concern. The same frequency of excitation, however, may excite the steering gear assist control valve in a range that is likely to be audibly noticeable. In order to mask audible output, the base frequency of the pulse width modulation output will vary in a manner proportional to the rotational speed of the vehicle engine. Since the electromagnetic frequency response of the steering gear assist control valve may vary with pulse width modulation base frequency, electromechanical valve control in this invention also includes pulse width modification in order to compensate for electromagnetic frequency response effects.

Accordingly, the present invention provides a system whereby the input torque is measured by the torque sensor 56. The measured torque is used with the calculated steering input torque reference values to determine or calculate an assist command. The system is a dynamic system where the assist command is based on a feedback loop that calculates the assist command based upon the measured torque and calculated steering input torque reference value. One rate of calculation involves a data sampling and control update rate of at least thirty hertz (30 hz). It should be understood that steering assist or hydraulic assembly can be used to provide additional feel to the operator in that it can either increase or decrease the effort used to rotate the steering wheel along with providing a return force or filtering out road input or torque generated by or during vehicle operation. Accordingly, the present invention uses a hydraulic assist assembly wherein a control valve and torque sensor are used to monitor and regulate the amount of assist provided.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for providing fluid assistance to a vehicle steering system comprising the steps of:
    providing a steering gear having a fluid assist assembly, an input shaft attached to said steering gear and a steering wheel attached to said input shaft;
    providing a fluid pressure source and a control valve for regulating fluid pressure supplied from said fluid pressure source to said fluid assist assembly;
    using a torque sensor to measure torque in said steering system; and regulating said measured torque based on input from a steering input rotation sensor mounted to the input shaft by supplying fluid pressure to said fluid assist assembly, with said input from said steering rotation sensor comprising:
    generating a normalized steering input torque reference value by processing steering input rotation data including steering rotational position data and steering input rotational velocity data.

2. A method for providing fluid assistance to a vehicle steering system as set forth in claim 1 including the step of:
    comparing the normalized steering input torque reference value and the measured torque to generate an assist command, said an assist command calculated to minimize the magnitude of deference between the normalized steering input torque reference value and the measured torque.

3. A method for providing fluid assistance to a vehicle steering system as set forth in claim 1 including the, step of:
    using a frequency-dependent or magnitude-dependent compensation to minimize the error between the normalized steering input torque reference value and the measured steering input torque value.

4. A method for providing fluid assistance to a vehicle steering system as set forth in claim 1 including the step of:
    using a frequency-dependent compensation value to suppress transmission of road wheel-induced disturbances relative to measured steering input torque value.

5. A method for providing fluid assistance to a vehicle steering system as set forth in claim 1 including the steps of:
    monitoring said system for failure mode effect detection in the event of torque sensor faults or failure to minimize the magnitude of difference between the adjusted steering input torque reference and the measured steering input torque value;
    adjusting the steering assist command in response to vehicle operational status data in the event of detection of failure to minimize, the error between the steering input torque reference value and the measured steering input torque.

6. A method for providing fluid assistance to a vehicle steering system as set forth in claim 1 including the step of:
    providing an engine speed-dependent electromechanical valve control for controlling said valve, said valve control outputting an electric current signal having a base frequency that varies in a manner proportional to the rotational speed of the vehicle engine.

7. A method for providing fluid assistance to a vehicle steering system as set forth in claim 1 including the steps of:
    using steering input rotation absolute position data, steering input rotation velocity data, vehicle speed data, adjusted steering input torque reference data and command steering assist data to generate a road grip identification value; and
    generating a new adjusted steering input torque reference from the normalized steering input torque reference according to the identified road grip value.

* * * * *